(12) United States Patent
Otani

(10) Patent No.: US 9,632,397 B2
(45) Date of Patent: Apr. 25, 2017

(54) PROJECTOR WITH SERIES POSITIONED PIXEL MATRICES

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 128 days.

(21) Appl. No.: 14/515,177

(22) Filed: Oct. 15, 2014

(65) Prior Publication Data

US 2015/0109538 A1 Apr. 23, 2015

(30) Foreign Application Priority Data

Oct. 22, 2013 (JP) ................................ 2013-218956

(51) Int. Cl.
| | |
|---|---|
| *G03B 21/00* | (2006.01) |
| *G02F 1/13* | (2006.01) |
| *G02B 27/14* | (2006.01) |
| *H04N 9/31* | (2006.01) |
| *G02B 9/62* | (2006.01) |
| *G02B 27/10* | (2006.01) |

(52) U.S. Cl.
CPC ........... *G03B 21/00* (2013.01); *G02B 27/141* (2013.01); *G02F 1/1313* (2013.01); *G03B 21/006* (2013.01); *H04N 9/3152* (2013.01); *G02B 9/62* (2013.01); *G02B 27/1046* (2013.01)

(58) Field of Classification Search
CPC .... G02B 27/141; G02B 27/1046; G02B 9/62; G02F 1/1313; G03B 21/00; H04N 9/3152
See application file for complete search history.

(56) References Cited

U.S. PATENT DOCUMENTS

| | | | |
|---|---|---|---|
| 7,234,822 B2 | 6/2007 | Uchiyama et al. | |
| 7,317,578 B2 | 1/2008 | Drazic et al. | |
| 7,712,902 B2 | 5/2010 | Nakamura et al. | |
| 2005/0271312 A1 | 12/2005 | Uchiyama et al. | |
| 2006/0082892 A1* | 4/2006 | Drazic | G02B 13/0095 359/649 |
| 2006/0215130 A1 | 9/2006 | Nakamura et al. | |
| 2011/0234983 A1* | 9/2011 | Maruyama | H04N 9/3105 353/31 |
| 2013/0113788 A1 | 5/2013 | Schuck | |
| 2015/0172609 A1* | 6/2015 | Otani | H04N 9/3152 353/20 |

FOREIGN PATENT DOCUMENTS

| | | |
|---|---|---|
| JP | A-2005-189282 | 7/2005 |
| JP | A-2005-208573 | 8/2005 |
| JP | A-2006-509244 | 3/2006 |
| JP | A-2007-148319 | 6/2007 |

* cited by examiner

*Primary Examiner* — Sultan Chowdhury
*Assistant Examiner* — Magda Cruz
(74) *Attorney, Agent, or Firm* — Oliff PLC

(57) ABSTRACT

Since a relay optical system includes double gauss lenses and pairs of meniscus lenses disposed so as to be convex toward the double gauss lenses, it is possible to sufficiently minimize the occurrence of aberration from dimming light valves to color modulation light valves, to maintain an image formation state with high performance, and further to form a favorable image.

7 Claims, 8 Drawing Sheets

PROJECTOR WITH SERIES POSITIONED PIXEL MATRICES

BACKGROUND

1. Technical Field

The present invention relates to a projector including a first spatial modulation element and a second spatial modulation element which are disposed in series on a light path.

2. Related Art

A projector is known in which two spatial modulation elements are arranged in series in order to increase image contrast (refer to JP-T-2006-509244, JP-A-2005-189282, and JP-A-2005-208573). In this case, a relay lens is disposed between the two spatial modulation elements, and one image of the two spatial modulation elements is superimposed on the other image so as to form an image. Particularly, in JP-T-2006-509244, when an image is formed between two spatial modulation elements, a double gauss lens is used as a relay lens.

However, even if aberration is minimized to an extent by using the double gauss lens as the relay lens between the two spatial modulation elements as described above, a variety of aberrations (for example, a field curvature or astigmatism) cannot be sufficiently minimized, and it is not necessarily easy to maintain an image formation state in a small size, with good telecentricity, and with high performance.

SUMMARY

An advantage of some aspects of the invention is to provide a projector which includes a first pixel matrix and a second pixel matrix which are two spatial modulation elements arranged in series on an optical path, and can maintain an image formation state in a small size, with good telecentricity, and with high performance.

An aspect of the invention is directed to a projector including an illumination optical system that emits light; a light modulation device that modulates light emitted from the illumination optical system; and a projection optical system that projects light modulated by the light modulation device, in which the light modulation device includes a first pixel matrix and a second pixel matrix that are disposed in series on an optical path of the light emitted from the illumination optical system; and a relay optical system that is disposed on the optical path between the first pixel matrix and the second pixel matrix, in which the relay optical system includes a double gauss lens; and a pair of meniscus lenses that are disposed with the double gauss lens interposed therebetween along the optical path and each of which has a positive power, and in which the pair of meniscus lenses are convex toward the double gauss lens side. Here, two pixel matrices being disposed in series on the optical path indicates that one pixel matrix (for example, the first pixel matrix) is disposed so as to be located further toward the optical path upstream side than the other pixel matrix (for example, the second pixel matrix) when a certain optical path is followed. In other words, the first pixel matrix and the second pixel matrix are disposed relatively on the optical path upstream side and the optical path downstream side.

According to the projector, the relay optical system which relays image formation between the first pixel matrix and the second pixel matrix includes the pair of meniscus lenses having a positive power as well as the double gauss lens. In addition, the meniscus lenses are disposed with the double gauss lens interposed therebetween along the optical path, and are disposed so as to be convex toward the double gauss lens side. Thus, it is possible to prevent a size of a device from being increased, to make telecentricity favorable, and to improve image formation performance of the optical system in which two pixel matrices are disposed at conjugate positions.

In a specific aspect of the invention, the relay optical system includes a diaphragm at the double gauss lens, and is an optical system of equal magnification which is symmetric with respect to a position of the diaphragm along an optical axis. In this case, since the relay optical system is symmetric with respect to a position of the diaphragm, for example, pixel matrices having the same standards are used as both the two pixel matrices, and are equivalently disposed, so as to minimize coma aberration and distortion aberration. In addition, field curvature aberration and astigmatism are minimized by using the meniscus lenses, and thus it is possible to implement a high performance relay optical system.

In another aspect of the invention, the first and second pixel matrices are transmissive liquid crystal pixel matrices. In this case, it is possible to form a bright image with a simple structure. In addition, the pair of meniscus lenses can be disposed so as to be close to the first and second pixel matrices, and thus it is possible to improve an aberration correction function using the meniscus lenses.

In still another aspect of the invention, in the relay optical system, when a focal length of the double gauss lens is set to $f_{dg}$, a focal length of a first meniscus lens of the pair of meniscus lenses disposed on a light incidence side of the double gauss lens is set to $f_1$, and a focal length of a second meniscus lens disposed on a light emission side is set to $f_2$, the following expression is satisfied.

$$1.7 \leq \frac{(f_1 + f_2)/2}{f_{dg}} \leq 2.1$$

In this case, both-side telecentricity can be achieved in the relay optical system, and it is possible to achieve a sufficient aberration correction effect using the meniscus lenses.

In yet another aspect of the invention, the projector further includes a color splitting/light guide optical system that splits the light emitted by the illumination optical system into a plurality of color light beams of different wavelength bands and guides the color light beams; a modulation optical system that is provided with a plurality of light modulation devices each of which includes the first pixel matrix, the second pixel matrix, and the relay optical system corresponding to the plurality of color light beams, and that modulates the plurality of color light beams split by the color splitting/light guide optical system; and a composition optical system that combines modulated light beams of respective colors which have been modulated by the modulation optical system with each other, and projects combined light toward the projection optical system. In this case, it is possible to form a color image by modulating and combining the plurality of color light beams.

In still yet another aspect, the color splitting/light guide optical system and the modulation optical system are disposed so that optical paths of the plurality of color light beams from splitting of the light in the color splitting/light guide optical system to combination of the light beams in the composition optical system are in an equal optical path length. In this case, it is possible to prevent the occurrence of color unevenness caused by the number of inversions of color light. In addition, in the configuration in which the first pixel matrix and the second pixel matrix are provided, an entire device can be made relatively compact.

In further another aspect of the invention, in the light modulation device, of the first pixel matrix and the second pixel matrix, a single pixel of the first pixel matrix disposed on an optical path upstream side corresponds to a plurality of pixels of the second pixel matrix disposed on an optical path downstream side. In this case, luminance can be adjusted for each region (corresponding to a plurality of pixels in the second pixel matrix) in the first pixel matrix, and luminance can be adjusted for each pixel in the second pixel matrix.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, with reference to the drawings, a projector related to each embodiment of the invention will be described in detail.

Figure 1:
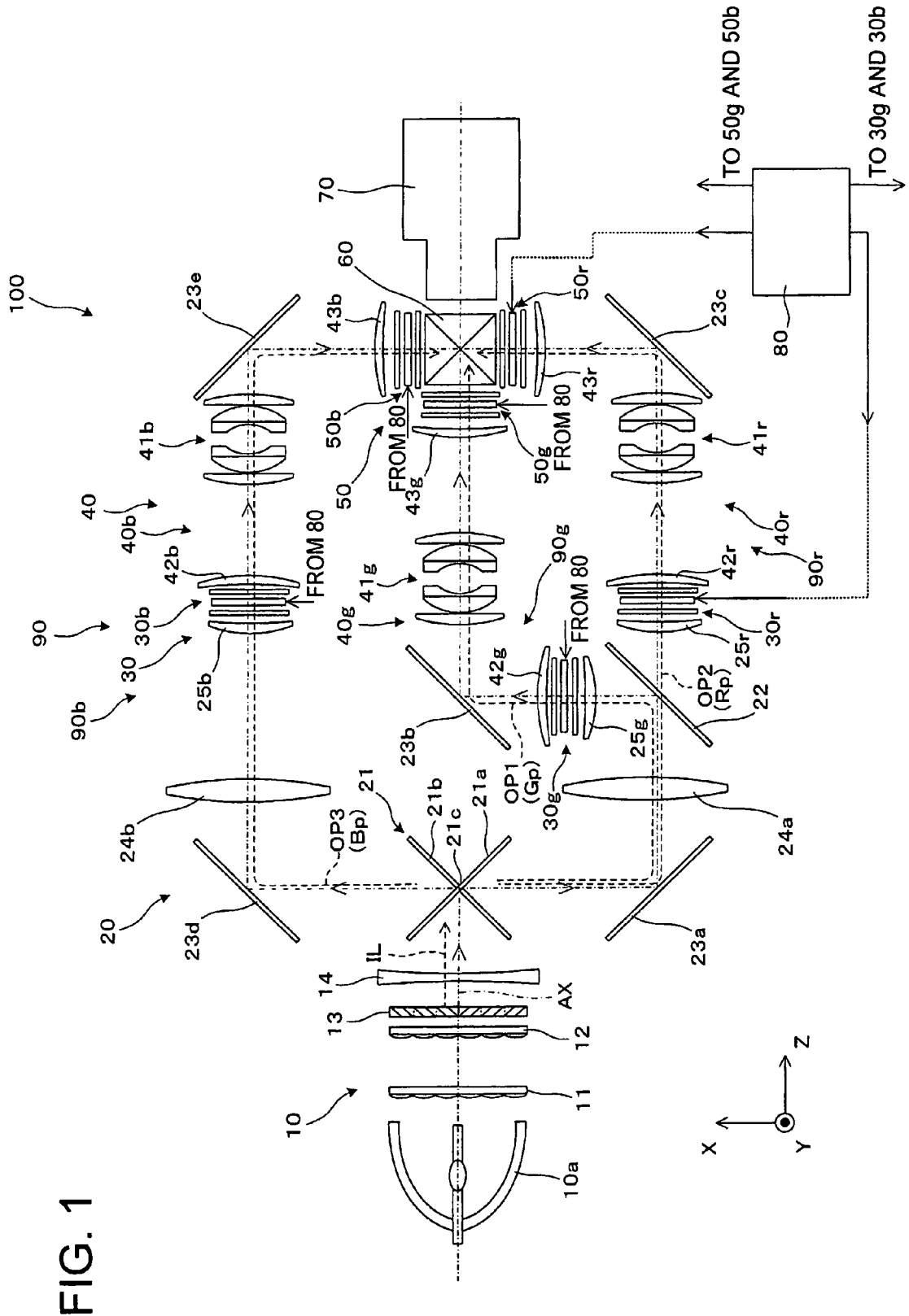
FIG. 1 is a diagram illustrating a schematic configuration of a projector related to a first embodiment or Example 1.

As illustrated in FIG. 1, a projector 100 according to a first embodiment of the invention includes an illumination optical system 10 which emits illumination light; a color splitting/light guide optical system 20 which separates the illumination light into a color light beam of each color and guides the color light beams; a modulation optical system 90 which spatially modulates each color light beam which is emitted from the illumination optical system 10 and is separated by the color splitting/light guide optical system 20; a composition optical system 60 which combines the separated and modulated color light beams (modulated light beams) with each other; a projection optical system 70 which projects the combined light; and a projector controller 80. Among the above-described optical systems, particularly, the modulation optical system 90 includes a dimming system 30 provided with a first pixel matrix; a relay optical system 40 which functions as a relay system between the first pixel matrix and a second pixel matrix; and an image display system 50 which includes the second pixel matrix. In addition, the projector controller 80 controls an operation of each optical system. Further, it is assumed that an optical axis for all the optical systems of the projector 100 is set to an optical axis AX, and, in FIG. 1, a plane including the optical axis AX is parallel to an XZ plane, and a direction of an emission axis of image light is set to a +Z direction.

The illumination optical system 10 includes a light source 10a; a first lens array (first integrator lens) 11 including a plurality of lens elements which are arranged in an array form; a second lens array (second integrator lens) 12; a polarization conversion element 13 which converts light from the second lens array 12 into a predetermined linearly polarized light; and a superimposition lens 14. The illumination optical system 10 emits illumination light with a light amount which is sufficient to form an image. In addition, the light source 10a is, for example, an ultra-high pressure mercury lamp, and emits light including R light, G light, and B light. Further, the light source 10a may be discharge light sources other than the ultra-high pressure mercury lamp, and may be a solid-state light source such as an LED or a laser source. The lens arrays 11 and 12 divide a luminous flux from the light source 10a into light beams and collect the light beams, and the polarization conversion element 13 forms illumination light which is superimposed in an illuminated region of a dimming light valve constituting the dimming system 30, in cooperation with the superimposition lens 14.

The color splitting/light guide optical system 20 includes a cross-dichroic mirror 21, a dichroic mirror 22, bending mirrors 23a, 23b, 23c, 23d and 23e, first lenses 24a and 24b, and second lenses 25g, 25r and 25b. Here, the cross-dichroic mirror 21 includes a first dichroic mirror 21a and a second dichroic mirror 21b. The first and second dichroic mirrors 21a and 21b are perpendicular to each other, and an intersection axis 21c thereof extends in the Y direction. The color splitting/light guide optical system 20 splits illumination light from the illumination optical system 10 into three color light beams of green, red, and blue, and guides each color light beam.

The modulation optical system 90 includes a plurality of light modulation devices which respectively correspond to the three split color light beams. Particularly, in the present embodiment, the modulation optical system 90 includes the dimming system 30 which is located on a relatively optical path upstream side, the image display system 50 which is located on a relatively optical path downstream side, and the relay optical system 40 which is disposed therebetween.

In the modulation optical system 90, the dimming system 30 includes three dimming light valves 30g, 30r and 30b which respectively correspond to the color light beams, split by the color splitting/light guide optical system 20, including three colors (red, green, and blue). Each of the dimming light valves 30g, 30r and 30b includes a transmissive liquid crystal pixel matrix, and is a non-emissive light modulation unit which adjusts an intensity of the color light. Specifically, each of the dimming light valves 30g, 30r and 30b includes a transmissive liquid crystal panel which is a main body part of the liquid crystal pixel matrix (first pixel matrix), an incidence side polarization plate which is provided on a light incidence side of the liquid crystal panel, and an emission side polarization plate which is provided on a light emission side of the liquid crystal panel. In addition, the incidence side polarization plate and the emission side polarization plate are in a cross-nicol alignment. Hereinafter, an operation of controlling each of the dimming light valves 30g, 30r and 30b will be described briefly. First, a brightness control signal is determined from an input image signal by the projector controller 80. Next, a dimming driver (not illustrated) is controlled by the determined brightness control signal. The dimming light valves 30g, 30r and 30b are driven by the controlled dimming driver, and each intensity of color light beams including three colors (red, green, and blue) is adjusted.

In the modulation optical system 90, the relay optical system 40 includes three optical systems 40g, 40r and 40b so as to respectively correspond to the three dimming light valves 30g, 30r and 30b constituting the dimming system 30. For example, the optical system 40g includes a double gauss lens 41g and a pair of meniscus lenses 42g and 43g. In addition, although described later in detail, the pair of meniscus lenses 42g and 43g are positive lenses, and are disposed with the double gauss lens 41g interposed therebetween on the optical path. Each of the meniscus lenses 42g and 43g is disposed so as to be convex toward the double gauss lens 41g side. In other words, a convex surface thereof is directed toward the double gauss lens 41g side. Further, the other optical systems 40r and 40b respectively include double gauss lenses 41r and 41b and pairs of meniscus lenses 42r, 43r, 42b and 43b having the same structure.

In the modulation optical system 90, the image display system 50 includes three color modulation light valves 50g, 50r and 50b which respectively correspond to color light beams including three colors (red, green, and blue) which have passed through the relay optical system 40. Each of the color modulation light valves 50g, 50r and 50b includes a transmissive liquid crystal pixel matrix, and is a non-emissive light modulation unit which modulates a spatial distribution of an intensity of each color light beam which is incident illumination light. Specifically, each of the color modulation light valves 50g, 50r and 50b includes a liquid crystal panel which is the liquid crystal pixel matrix (second pixel matrix), an incidence side polarization plate which is provided on a light incidence side of the liquid crystal panel, and an emission side polarization plate which is provided on a light emission side of the liquid crystal panel. Hereinafter, an operation of controlling each of the color modulation light valves 50g, 50r and 50b will be described briefly. First, the projector controller 80 converts an input image signal into an image light valve control signal. Next, a panel driver (not illustrated) is controlled by the converted image light valve control signal. The three color modulation light valves 50g, 50r and 50b driven by the controlled panel driver modulate three color light beams, so as to form an image corresponding to the input image information (image signal).

In addition, it can be said that the above modulation optical system 90 is constituted by three light modulation devices 90g, 90r and 90b. In other words, the light modulation device 90g is disposed so as to correspond to green light, and includes the dimming light valve 30g, the optical system 40g, and the color modulation light valve 50g. Similarly, the light modulation device 90r is disposed so as to correspond to red light, and includes the dimming light valve 30r, the optical system 40r, and the color modulation light valve 50r. In addition, the light modulation device 90b is disposed so as to correspond to blue light, and includes the dimming light valve 30b, the optical system 40b, and the color modulation light valve 50b. As mentioned above, in a case where the modulation optical system 90 is viewed in terms of the three light modulation devices 90g, 90r and 90b, in a single light modulation device (for example, the light modulation device 90g), a dimming light valve (the dimming light valve 30g) corresponding to a first pixel matrix, a relay optical system (the optical system 40g), and a color modulation light valve (the color modulation light valve 50g) corresponding to a second pixel matrix are disposed in this order along the optical path. In other words, the dimming light valve and the color modulation light valve having a correspondence relationship are disposed in series.

The composition optical system 60 is a cross-dichroic prism obtained by joining four right-angle prisms together. The composition optical system 60 combines modulated light beams of respective colors which are modulated by the color modulation light valves 50g, 50r and 50b constituting the image display system 50, and emits the combined light toward the projection optical system 70.

The projection optical system 70 projects the combined light which is modulated by the color modulation light valves 50g, 50r and 50b as a light modulation device and is further combined by the composition optical system 60, toward a subject (not illustrated) such as a screen.

Hereinafter, details of forming image light will be described. First, an illumination luminous flux IL is emitted as illumination light from the illumination optical system 10. Next, in the color splitting/light guide optical system 20, the first dichroic mirror 21a of the cross-dichroic mirror 21 reflects green (G) light and red (R) light included in the illumination luminous flux IL, and transmits remaining blue (B) light therethrough. On the other hand, the second dichroic mirror 21b of the cross-dichroic mirror 21 reflects blue (B) light, and transmits green (G) light and red (R) light. The dichroic mirror 22 reflects green (G) light of the incident green and red (GR) light beams, and transmits the remaining red (R) light therethrough. Respective color light beams Gp, Rp and Bp split from the illumination luminous flux IL by the color splitting/light guide optical system 20 will be explained in more detail along optical paths OP1 to OP3 of the respective colors. Firstly, the illumination luminous flux IL from the illumination optical system 10 is incident to the cross-dichroic mirror 21 and is split into color light beams. Among components of the illumination luminous flux IL, the green light Gp (optical path OP1) is reflected by the first dichroic mirror 21a of the cross-dichroic mirror 21 so as to branch, and is further reflected by the dichroic mirror 22 via the bending mirror 23a so as to branch and to be incident to the dimming light valve 30g corresponding to the green light Gp among the three dimming light valves of the dimming system 30. In addition, among the components of the illumination luminous flux IL, the red light Rp (optical path OP2) is reflected by the first dichroic mirror 21a of the cross-dichroic mirror 21 so as to branch, and passes through the dichroic mirror 22 via the bending mirror 23a so as to branch and to be incident to the dimming light valve 30r corresponding to the red light Rp among the three dimming light valves of the dimming system 30. Further, among the components of the illumination luminous flux IL, the blue light Bp (optical path OP3) is reflected by the second dichroic mirror 21b of the cross-dichroic mirror 21 so as to branch, and is incident to the dimming light valve 30b corresponding to the blue light Bp among the three dimming light valves of the dimming system 30 via the bending mirror 23d. As described above, the dimming light valves 30g, 30r and 30b constituting the dimming system 30 respectively adjust intensities of the color light beams Gp, Rp and Bp including the three colors (red, green, and blue) under the control of the projector controller 80. Furthermore, the first lenses 24a and 24b and the second lenses 25g, 25r and 25b disposed on the optical paths OP1 to OP3 are provided in order to adjust angle states of the color light beams Gp, Rp and Bp incident to the corresponding dimming light valves 30g, 30r and 30b.

The respective color light beams Gp, Rp and Bp whose luminance has been adjusted in the dimming system 30 respectively pass through the optical systems 40g, 40r and 40b which constitute the relay optical system 40 and are disposed so as to correspond to the colors, and are respectively incident to the three color modulation light valves 50g, 50r and 50b constituting the image display system 50. In other words, the green light Gp emitted from the dimming light valve 30g is incident to the color modulation light valve 50g via the optical system 40g and the bending mirror 23b. The red light Rp emitted from the dimming light valve 30r is incident to the color modulation light valve 50r via the optical system 40r and the bending mirror 23c. The blue light Bp emitted from the dimming light valve 30b is incident to the color modulation light valve 50b via the optical system 40b and the bending mirror 23e. The color modulation light valves 50g, 50r and 50b constituting the image display system 50 respectively modulate the three color light beams as described above under the control of the projector controller 80, so as to form images of respective colors. The modulated light beams of respective colors modulated by the color modulation light valves 50g, 50r and 50b are combined with each other in the composition optical system 60, so as to be projected by the projection optical system 70.

In addition, in the above case, lengths of the optical paths OP1 to OP3 of the color light beams are the same as each other, that is, are in an equal optical path length.

As mentioned above, the projector 100 has a series arrangement in which the dimming light valves 30g, 30r and 30b (first pixel matrices) which are luminance modulation elements are disposed on the optical path upstream side along the optical paths of the respective colors, and the color modulation light valves 50g, 50r and 50b (second pixel matrices) which are color modulation elements are disposed on the optical path downstream side along the optical paths of the respective colors. Here, the corresponding first pixel matrix and second pixel matrix (for example, the dimming light valve 30g and the color modulation light valve 50g) are required to substantially have an image formation relationship. However, generally, it is not necessarily easy to minimize the occurrence of a variety of aberrations, to maintain an image formation state with high accuracy between spatial modulation elements, to miniaturize a device, and to favorably maintain telecentricity. For example, an optical system of equal magnification is used as a relay optical system which is disposed between the first pixel matrix and the second pixel matrix, and thus an image is formed so as to superimpose an image of the first pixel matrix on an image of the second pixel matrix in a one-to-one relationship. Thus, in this case, among a variety of aberrations, for example, the occurrence of coma aberration or distortion can be minimized to some degree. However, it cannot be said that even the equal magnification configuration sufficiently minimizes the occurrence of field curvature or astigmatism. In addition, for example, it may be considered that a double gauss lens be disposed between spatial modulation elements, and thus accuracy of chromaticity aberration or the like is increased while preventing a size of a device from being increased, but even if the double gauss lens is used, it cannot be said that, for example, the occurrence of field curvature or astigmatism of a variety of aberrations is sufficiently minimized and an image formation state is maintained with sufficiently high accuracy. In contrast, in the present embodiment, the relay optical system 40 is provided between the dimming system 30 constituted by the dimming light valves 30g, 30r and 30b and the image display system 50 constituted by the color modulation light valves 50g, 50r and 50b, and not only the double gauss lenses 41g, 41r and 41b but also the pairs of convex meniscus lenses 42g, 43g, 42r, 43r, 42b and 43b which are convex toward the inside are respectively provided in the optical systems 40g, 40r and 40b of the respective colors constituting the relay optical system 40. Thus, it is possible to miniaturize a device, to make telecentricity favorable, to maintain an image formation state with high accuracy, and to form a favorable image.

Figure 2:
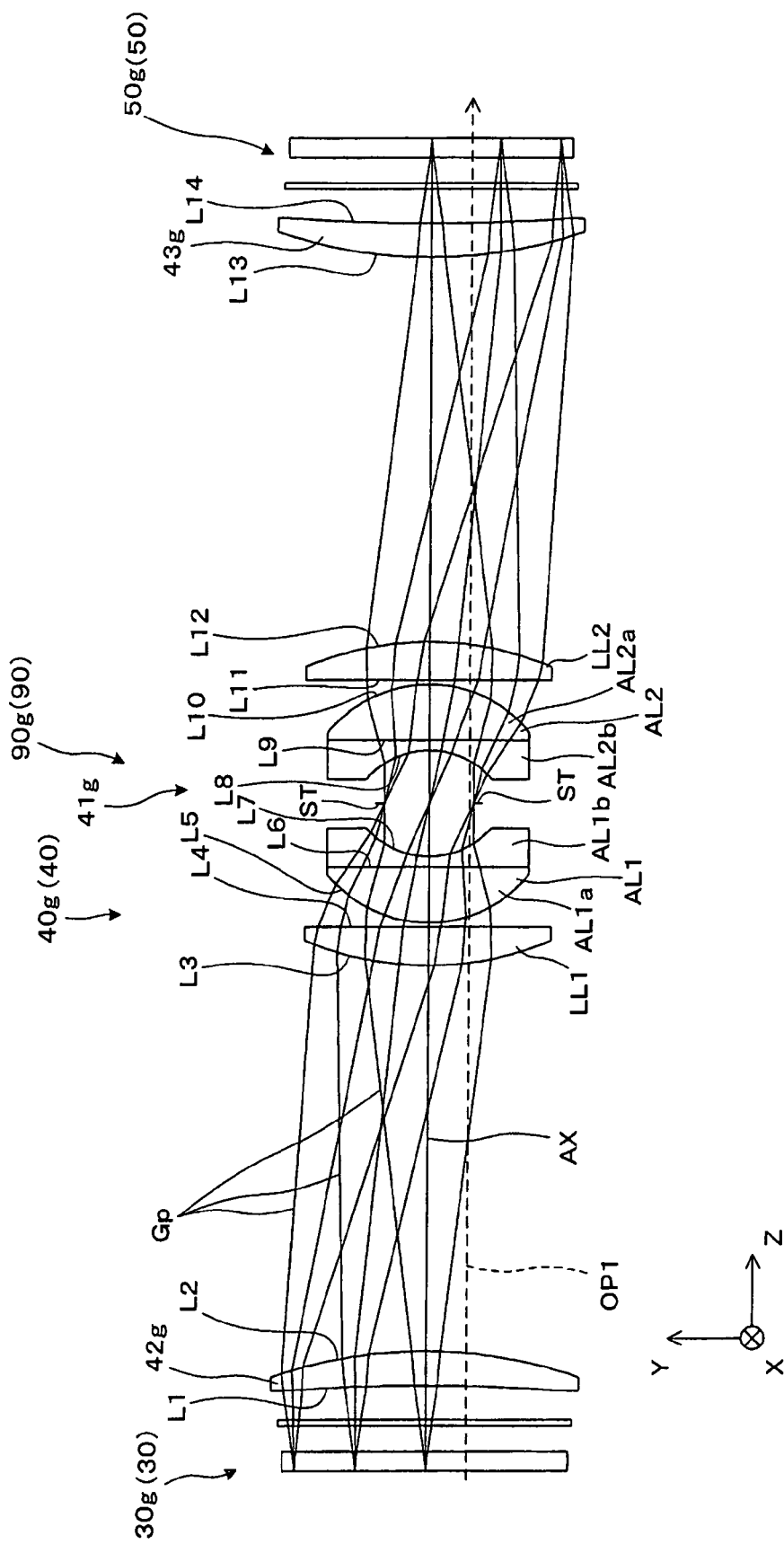
FIG. 2 is a diagram illustrating an optical path which is developed from a first liquid crystal pixel matrix to a second liquid crystal pixel matrix in the projector of FIG. 1.

FIG. 2 is a diagram illustrating an example of an optical path (for example, the optical path OP1) which is developed from the first liquid crystal pixel matrix to the second liquid crystal pixel matrix. In addition, herein, each direction of XYZ is illustrated with a traveling direction of light in the developed state as a +Z direction. Further, FIG. 2 illustrates an image formation state of illumination light (green light Gp) in relation to the dimming system 30 (the dimming light valve 30g), the relay optical system 40 (the optical system 40g), and the image display system 50 (the color modulation light valve 50g) constituting a light modulation device (in a case of the optical path OP1, the light modulation device 90g) which is the modulation optical system 90 on one optical path (for example, the optical path OP1) among the three optical paths which branch out through color splitting, particularly, with the optical system 40g constituting the relay optical system 40 as a center. In addition, as described above, in the present embodiment, the optical paths of the respective color light beams are in an equal optical path length, and thus the other optical paths (for example, the optical paths OP2 and OP3) are developed in the same manner, and illustration and description thereof will be omitted.

As described above, the optical system 40g includes the double gauss lens 41g and the pair of meniscus lenses 42g and 43g. Each part of the optical system 40g will be described more in detail with reference to FIG. 2. First, the double gauss lens 41g is constituted by a first lens LL1, a first achromatic lens AL1, a diaphragm ST, a second achromatic lens AL2, and a second lens LL2 in this order along the optical path. In addition, each of the first achromatic lens AL1 and the second achromatic lens AL2 is formed by combining two lenses. In other words, the first achromatic lens AL1 is formed by joining a lens AL1a and a lens A11b, and the second achromatic lens AL2 is formed by joining a lens AL2a and a lens AL2b. Therefore, each of the first achromatic lens AL1 and the second achromatic lens AL2 has a total of three lens surfaces including a front surface, a rear surface, and a joint surface.

In addition, the pair of meniscus lenses 42g and 43g are lenses having a positive refractive power and the same shape as each other, and are disposed symmetrically with respect to the double gauss lens 41g with the double gauss lens 41g interposed therebetween. Particularly, the pair of meniscus lenses 42g and 43g are disposed so as to be convex toward the double gauss lens 41g side. In other words, the meniscus lens 42g which is a first meniscus lens disposed on a rear stage of the dimming light valve 30g is convex toward the optical path downstream side, and the meniscus lens 43g which is a second meniscus lens disposed on a front stage of the color modulation light valve 50g is convex toward the optical path upstream side.

Here, the optical system 40g including the double gauss lens 41g is an optical system of equal magnification which is symmetric along the optical axis AX with respect to a position of the diaphragm ST of the double gauss lens 41g. In other words, the optical system 40g has a lens arrangement configuration which is symmetric with the diaphragm ST as a symmetry plane. In other words, in the optical system 40g, an optical system which is disposed on the optical path upstream side and an optical system which is disposed on the optical path downstream side having the same shape, material and arrangement are joined to each other in a mirror-symmetry manner with the diaphragm ST as a center.

In the optical system 40g, the meniscus lens 42g disposed on the optical system upstream side of the diaphragm ST has a lens surface L1 and a lens surface L2; the first lens LL1 has a lens surface L3 and a lens surface L4; and the first achromatic lens AL1 has a lens surface L5, a lens surface L6, and a lens surface L7. In addition, in the optical system 40g, the second achromatic lens AL2 disposed on the optical path downstream side of the diaphragm ST has a lens surface L8, a lens surface L9, and a lens surface L10; the second lens LL2 has a lens surface L11 and a lens surface L12; and the meniscus lens 43g has a lens surface L13 and a lens surface L14. Among the lens surfaces, for example, the lens surface L1 which is the first surface and the lens surface L14 which is the last surface are symmetric to each other with respect to the position of the diaphragm ST. Similarly, the lens surface L2 corresponds to the lens surface L13, the lens surface L3 corresponds to the lens surface L12, and the other lens surfaces have the same correspondence relationship.

As illustrated in FIG. 2, the green light Gp emitted from the dimming light valve 30g forms an image in the color modulation light valve 50g through the above-described respective lens surfaces L1 to L14.

Here, in the above-described relay optical system 40 (the optical system 40g), when a focal length of the double gauss lens 41g is set to $f_{dg}$, a focal length of the meniscus lens 42g which is a first meniscus lens disposed on the light incidence side of the pair of meniscus lenses 42g and 43g is set to $f_1$, and a focal length of the meniscus lens 43g which is a second meniscus lens disposed on the light emission side is set to $f_2$, the following expression is satisfied.

$$1.7 \leq \frac{(f_1 + f_2)/2}{f_{dg}} \leq 2.1$$

If each lens of the optical system 40g is configured in a range satisfying the expression, both-side telecentricity can be achieved in the optical system 40g constituting the relay optical system 40, and it is possible to achieve a sufficient aberration correction effect using the pair of meniscus lenses 42g and 43g. In addition, the above description is also the same for the other optical systems 40r and 40b constituting the relay optical system 40.

As mentioned above, in the projector 100 according to the present embodiment, since the relay optical system 40 (the optical systems 40g, 40r and 40b) includes the double gauss lenses 41g, 41r and 41b, and the pairs of meniscus lenses 42g, 43g, 42r, 43r, 42b and 43b disposed so as to be convex toward the double gauss lenses 41g, 41r and 41b, it is possible to sufficiently minimize the occurrence of aberration from the dimming light valves 30g, 30r and 30b to the color modulation light valves 50g, 50r and 50b, to maintain an image formation state with high performance, and further to form a favorable image. In addition, in the present embodiment, since the relay optical system for favorably maintaining an image formation state has a relatively simple configuration in which the pairs of meniscus lenses 42g, 43g, 42r, 43r, 42b and 43b are added to the double gauss lenses 41g, 41r and 41b, it is possible to prevent a size of a device from being increased. Further, since each of the optical systems 40g, 40r and 40b constituting the relay optical system 40 has a symmetric structure with respect to the position of the diaphragm ST, telecentricity can be maintained.

In addition, in the above-described example, resolutions of the dimming light valves 30g, 30r and 30b constituting the dimming system 30 may correspond to resolutions of the color modulation light valves 50g, 50r and 50b constituting the image display system 50, in a one-to-one relationship. In other words, for example, a resolution of the dimming light valve 30g of the dimming system 30 can be made to match a resolution of the color modulation light valve 50g of the image display system 50 corresponding to the dimming light valve 30g. However, the invention is not limited thereto, and resolutions of the color modulation light valves 50g, 50r and 50b may be much higher than resolutions of the dimming light valves 30g, 30r and 30b. In other words, for example, a single pixel of the dimming light valve 30g which is a first pixel matrix disposed on the optical path upstream side may correspond to a plurality of pixels of the color modulation light valve 50g which is a second pixel matrix disposed on the optical path downstream side. In this case, there is a configuration in which luminance is adjusted for each region corresponding to the plurality of pixels of the color modulation light valve 50g in the dimming light valve 30g, and luminance is adjusted for each pixel in the color modulation light valve 50g. In addition, the relationship between the optical path upstream side and the optical path downstream side may be reversed in relation to the first pixel matrix and the second pixel matrix. Further, in the above-described example, in relation to the number of grayscales (for example, 256 grayscales), the dimming light valves 30g, 30r and 30b are the same as the color modulation light valves 50g, 50r and 50b, but the number of grayscales may be different.

Examples

Hereinafter, Examples of the relay optical system of the projector related to an embodiment of the invention will be described. Symbols used in each Example are summarized in the following.

R: Curvature radius of lens surface
D: Distance between lens surfaces
Nd: Refractive index of optical material for d rays
Vd: Abbe number of optical material for d rays Example 1

Data of optical surfaces constituting a relay optical system of Example 1 is shown in the following Table 1. In addition, Table 1 and 2 also illustrate lenses of Example 1. Further, in FIG. 1, a "surface number" is a number which is given to each lens surface in order from a field side. Furthermore, "LP" added after the surface number indicates a position of a liquid crystal panel, "PP" indicates a position of a polarization plate, and "ST" indicates a position of a diaphragm. Moreover, a numerical value subsequent to E indicates an exponent part of base 10, and, for example, "1.00E+18" indicates $1.00 \times 10^{18}$.

TABLE 1

| Surface Number | R | D | Nd | vd |
|---|---|---|---|---|
| 1(LP) | 1.00E+18 | 2.3 | 1.51680 | 64.17 |
| 2 | 1.00E+18 | 3 | | |
| 3(PP) | 1.00E+18 | 0.7 | 1.51680 | 64.17 |
| 4 | 1.00E+18 | 4 | | |

TABLE 1-continued

| Surface Number | R | D | Nd | vd |
|---|---|---|---|---|
| 5 | −2.20E+02 | 4 | 1.84666 | 23.8 |
| 6 | −52.9245 | 45 | | |
| 7 | 35.38369 | 4.5 | 1.80440 | 39.6 |
| 8 | 1.00E+18 | 0.5 | | |
| 9 | 14.66884 | 6.5 | 1.79952 | 42.2 |
| 10 | 1.00E+18 | 1.2 | 1.76182 | 26.5 |
| 11 | 9.389741 | 6.16 | | |
| 12(ST) | 1.00E+18 | 6.16 | | |
| 13 | −9.38974 | 1.2 | 1.76182 | 26.5 |
| 14 | 1.00E+18 | 6.5 | 1.79952 | 42.2 |
| 15 | −14.6688 | 0.5 | | |
| 16 | 1.00E+18 | 4.5 | 1.80440 | 39.6 |
| 17 | −35.3837 | 45 | | |
| 18 | 5.29E+01 | 4 | 1.84666 | 23.8 |
| 19 | 2.20E+02 | 4 | | |
| 20(PP) | 1.00E+18 | 0.7 | 1.51680 | 64.17 |
| 21 | 1.00E+18 | 3 | | |
| 22(LP) | 1.00E+18 | 2.3 | 1.51680 | 64.17 |
| 23 | 1.00E+18 | 0 | | |

Figure 3A:
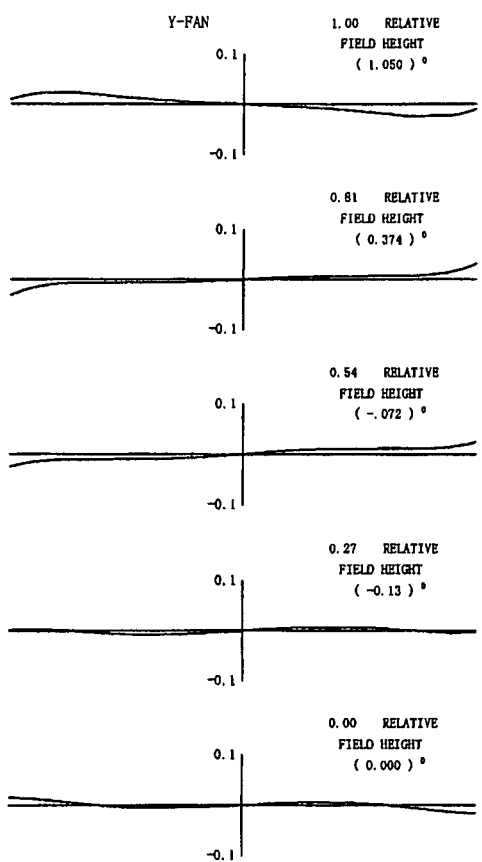
FIGS. 3A and 3B are diagrams illustrating aberration in the second liquid crystal pixel matrix.
Figure 3B:
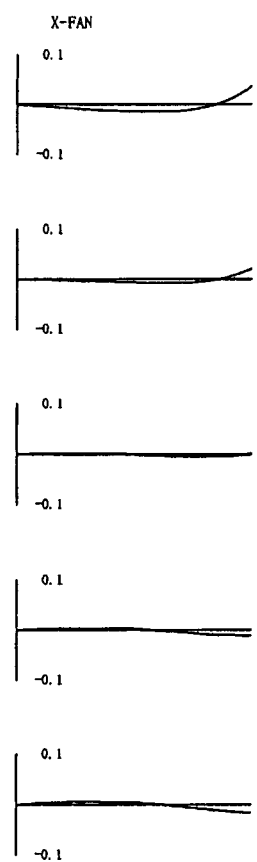

FIGS. 3A and 3B are diagrams illustrating aberration in the color modulation light valve 50g which is a second liquid crystal pixel matrix in the present example. FIG. 3A is a diagram illustrating lateral aberration regarding the Y direction when the Z direction is set as a light traveling direction in the same manner as in FIG. 2, and FIG. 3B is a diagram illustrating lateral aberration regarding the X direction. In addition, FIGS. 3A and 3B illustrate aberration in light of 550 nm among light beams of respective wavelength bands. In FIGS. 3A and 3B, the graphs show aberration at field heights of 0 mm, 4 mm, 8 mm, 12 mm, and 15 mm from the bottom. Further, if a focal length of the meniscus lens is 182.4 mm, a focal length of the double gauss lens is 92.7 mm, and the values are applied to the above-described expression, a result thereof is 1.97 which thus satisfies the above expression.

Figure 4:
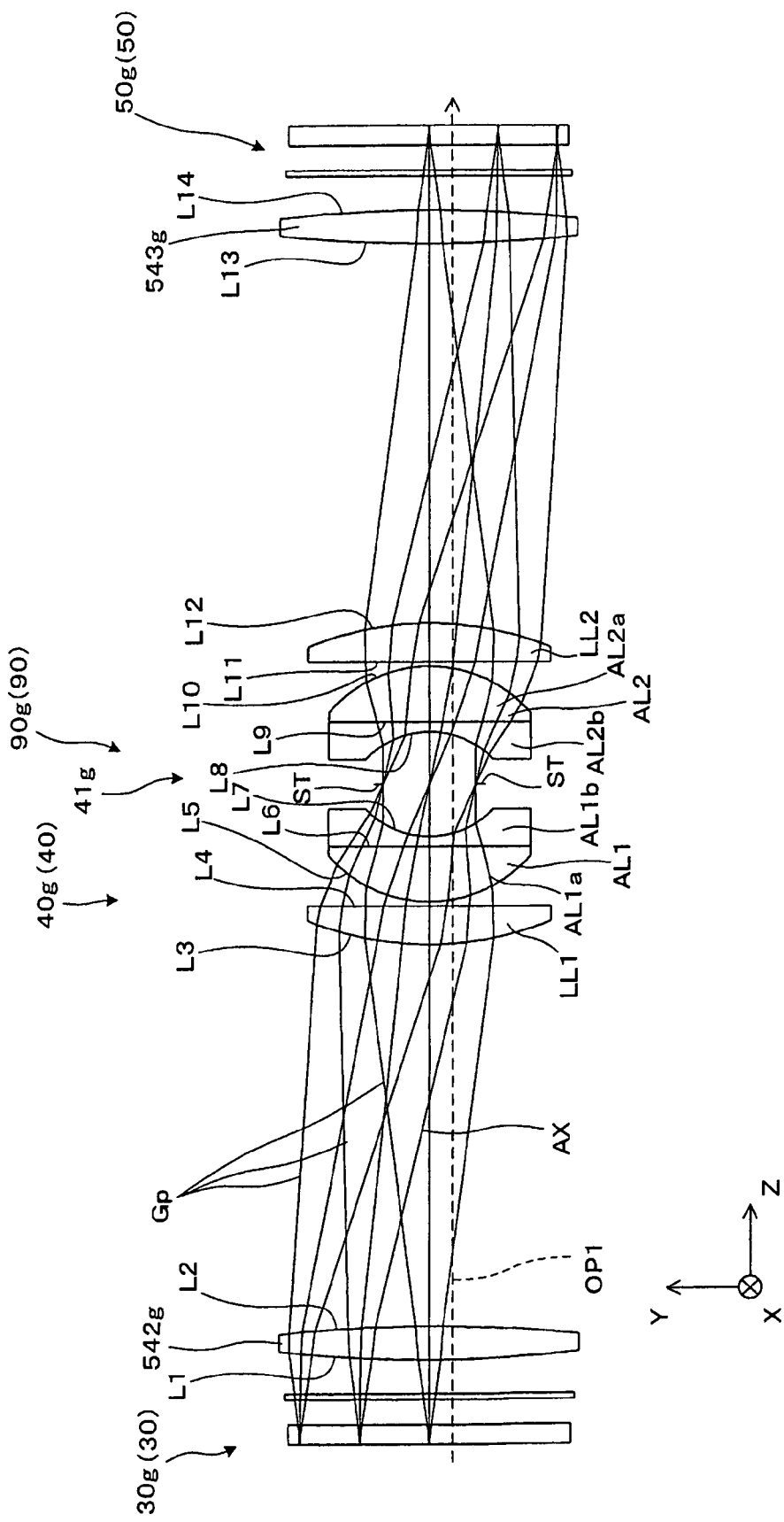
FIG. 4 is a diagram illustrating an optical path which is developed from a first liquid crystal pixel matrix to a second liquid crystal pixel matrix in a projector of a comparative example.

FIG. 4 is a diagram illustrating a relay optical system of a projector of a comparative example. In the comparative example, a pair of biconvex lenses 542g and 543g are disposed instead of the pair of meniscus lenses 42g and 43g (refer to FIG. 2) in a relay optical system (the optical system 40g).

Figure 5A:
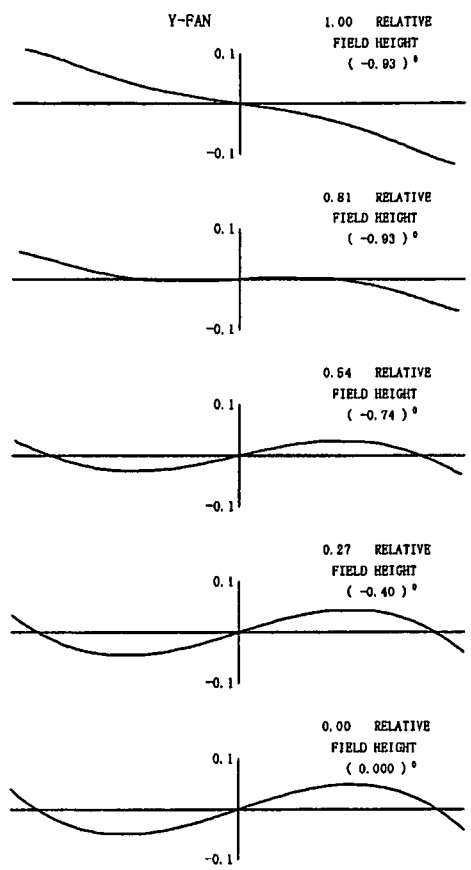
FIGS. 5A and 5B are diagrams illustrating aberration in the second liquid crystal pixel matrix of the projector of the comparative example.
Figure 5B:
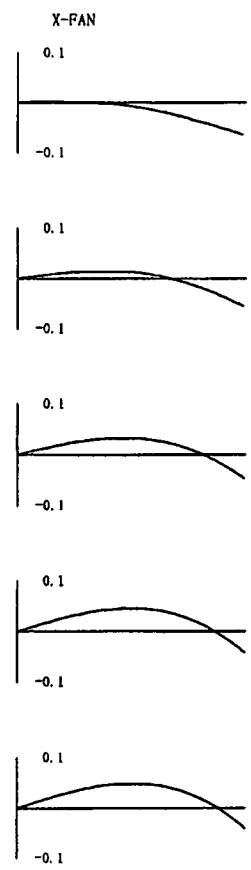

FIGS. 5A and 5B are diagrams illustrating aberration in the color modulation light valve 50g which is a second liquid crystal pixel matrix in the comparative example. FIG. 5A is a diagram illustrating lateral aberration regarding the Y direction when the Z direction is set as a light traveling direction in the same manner as in FIG. 4, and FIG. 5B is a diagram illustrating lateral aberration regarding the X direction. In addition, FIGS. 5A and 5B illustrate aberration in light of 550 nm among light beams of respective wavelength bands. When compared with Example 1, it can be seen that aberration is minimized in Example 1.

Second Embodiment

Hereinafter, a projector according to a second embodiment will be described. In addition, the present embodiment is a modification example of the projector of the first embodiment, and parts or matters which are not particularly described are the same as those in the first embodiment.

Figure 6:
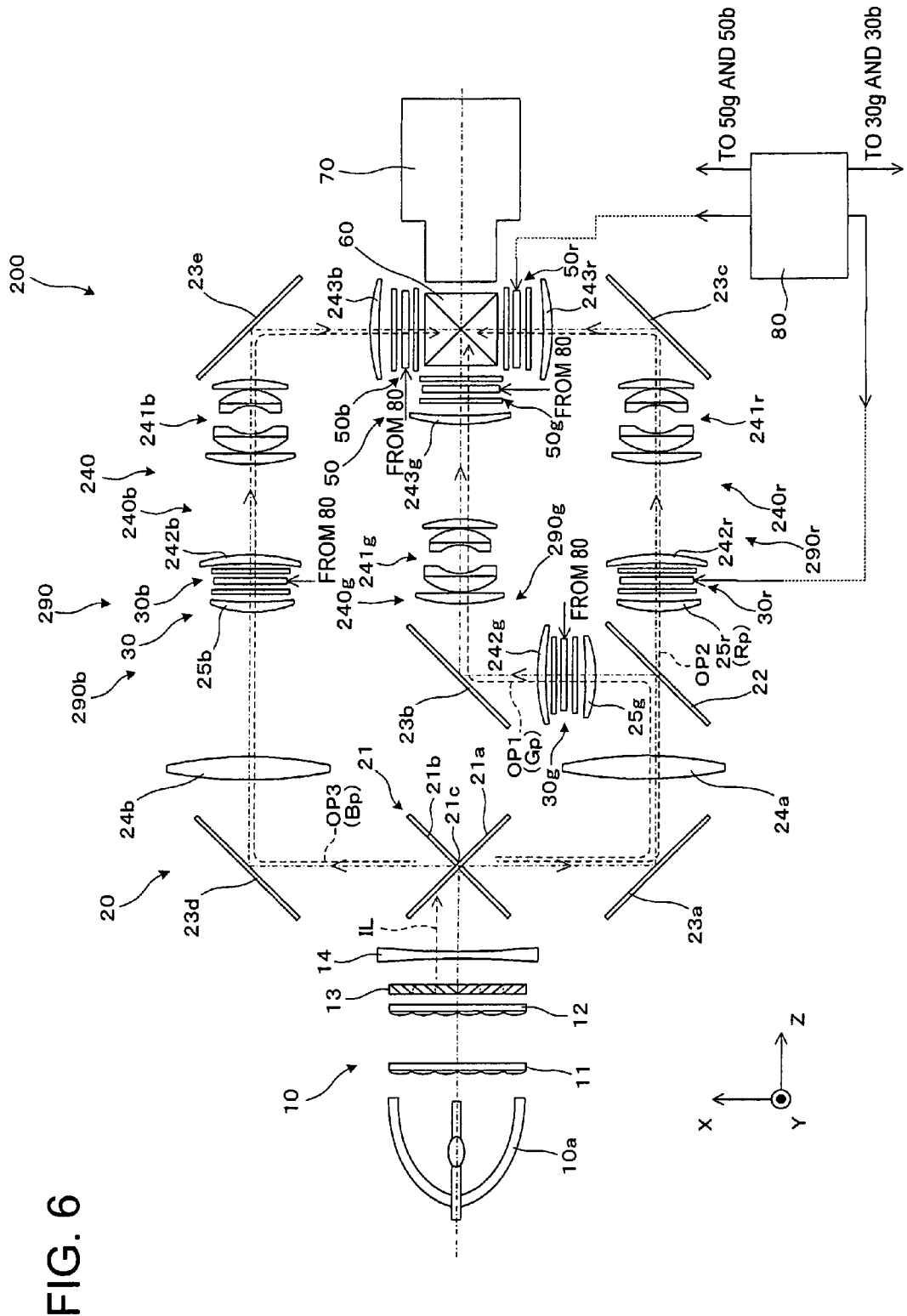
FIG. 6 is a diagram illustrating a schematic configuration of a projector related to a second embodiment or Example 2.
Figure 7:
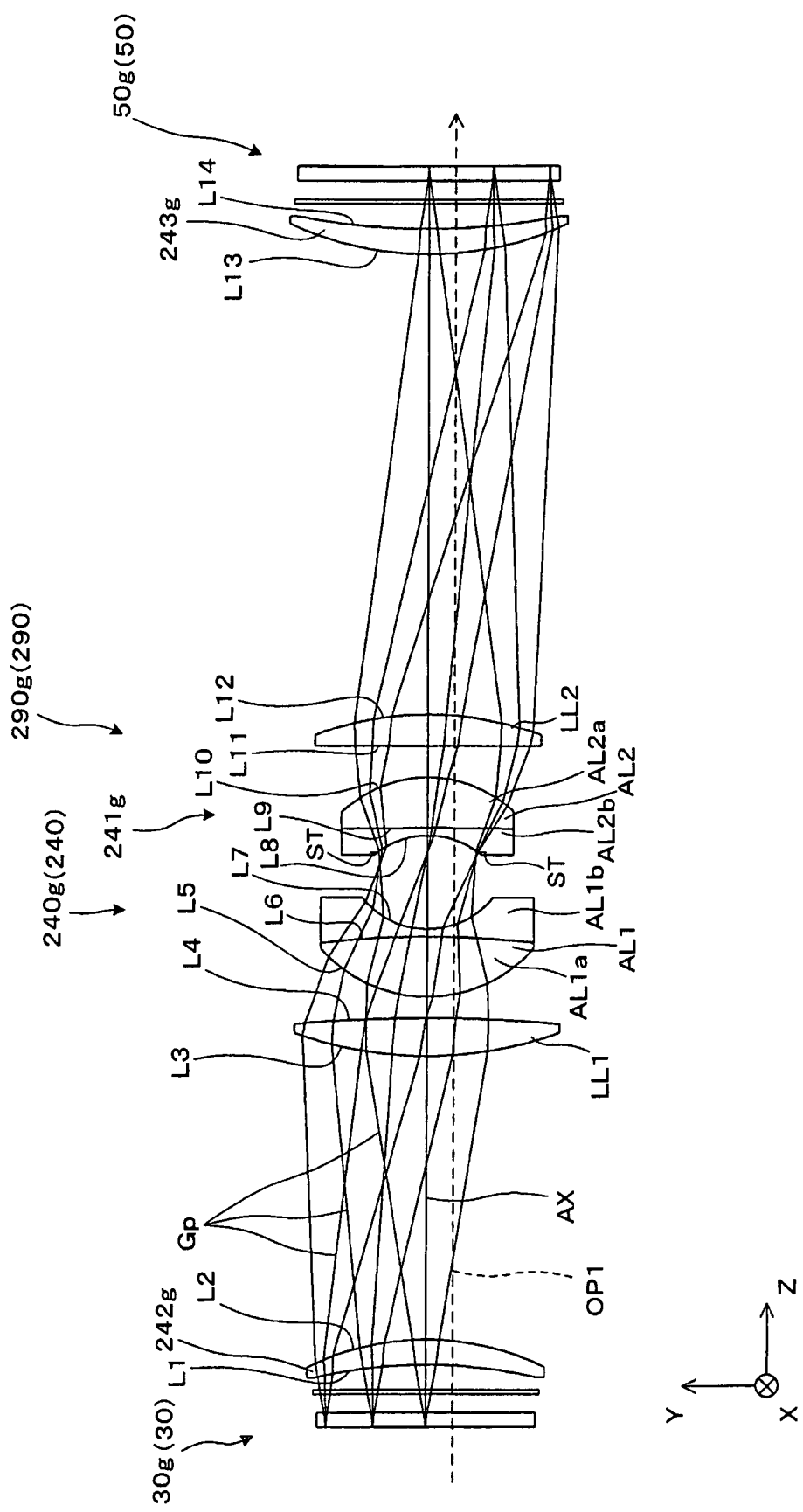
FIG. 7 is a diagram illustrating an optical path which is developed from a first liquid crystal pixel matrix to a second liquid crystal pixel matrix in the projector of FIG. 6.

FIG. 6 is a diagram illustrating a projector according to the second embodiment, and FIG. 7 is a diagram illustrating an example of an optical path which is developed from a first liquid crystal pixel matrix to a second liquid crystal pixel matrix and corresponds to FIG. 2 of the first embodiment. In addition, in a case of a configuration of FIG. 6, optical paths of respective color light beams are in an equal optical path length.

As illustrated in FIGS. 6 and 7, a relay optical system 240 of a projector 200 of the present embodiment has a structure different from that of the relay optical system 40 of the projector 100 of the first embodiment in the same manner as in FIG. 1. Specifically, each of optical systems 240g, 240r and 240b constituting the relay optical system 240 is not an optical system of equal magnification which is symmetric with respect to a position of the diaphragm along the optical axis AX, but is an optical system of 1.2 magnification. In addition, the relay optical system 240 is the same as the relay optical system 40 in that double gauss lenses 41g, 41r and 41b, and pairs of meniscus lenses 42g, 43g, 42r, 43r, 42b and 43b disposed so as to be convex toward the double gauss lenses 41g, 41r and 41b, are provided. For example, in FIG. 7, a first lens LL1 and a first achromatic lens AL1 disposed on the optical path upstream side of a diaphragm ST of the optical system 240g are larger than and also have shapes of lens surfaces different from a second lens LL2 and a second achromatic lens AL2 disposed on an optical path downstream side of the diaphragm ST. On the other hand, in relation to the pair of meniscus lenses 242g and 243g, the meniscus lens 242g disposed on the optical path upstream side is smaller than and also has a shape of a lens surface different from the meniscus lens 243g disposed on the optical path downstream side. In addition, arrangement gaps of the respective lenses have no symmetry, and the optical path upstream side and the optical path downstream side are not symmetric to each other and are thus different from each other.

Example 2

Data of optical surfaces constituting a relay optical system of Example 2 is shown in the following Table 2. Each symbol is the same as in Example 1. In addition, FIGS. 6 and 7 also illustrate lenses of Example 2.

TABLE 2

| Surface Number | R | D | Nd | vd |
|---|---|---|---|---|
| 1(LP) | 1.00E+18 | 2.3 | 1.51680 | 64.17 |
| 2 | 1.00E+18 | 3 | | |
| 3(PP) | 1.00E+18 | 0.7 | 1.51680 | 64.17 |
| 4 | 1.00E+18 | 4 | | |
| 5 | −70 | 4 | 1.59551 | 39.2 |
| 6 | −38.35 | 45 | | |
| 7 | 52.75 | 6 | 1.83400 | 37.2 |
| 8 | −275.2 | 3.849 | | |
| 9 | 19.2 | 8.45 | 1.78590 | 44.2 |
| 10 | −216.5 | 1.2 | 1.74077 | 27.8 |
| 11 | 11.9 | 12.666 | | |
| 12(ST) | 1.00E+18 | 2.666 | | |
| 13 | −12.15 | 1.2 | 1.76182 | 26.5 |
| 14 | −342.7 | 8 | 1.78590 | 44.2 |
| 15 | −17.8 | 5 | | |
| 16 | 1.00E+18 | 5 | 1.83481 | 42.7 |
| 17 | −46.4 | 72.56 | | |
| 18 | 51.35 | 4 | 1.83481 | 42.7 |
| 19 | 118 | 4 | | |
| 20(PP) | 1.00E+18 | 0.7 | 1.51680 | 64.17 |
| 21 | 1.00E+18 | 3 | | |
| 22(LP) | 1.00E+18 | 2.3 | 1.51680 | 64.17 |
| 23 | 1.00E+18 | 0 | | |

Figures 8A, 8B:
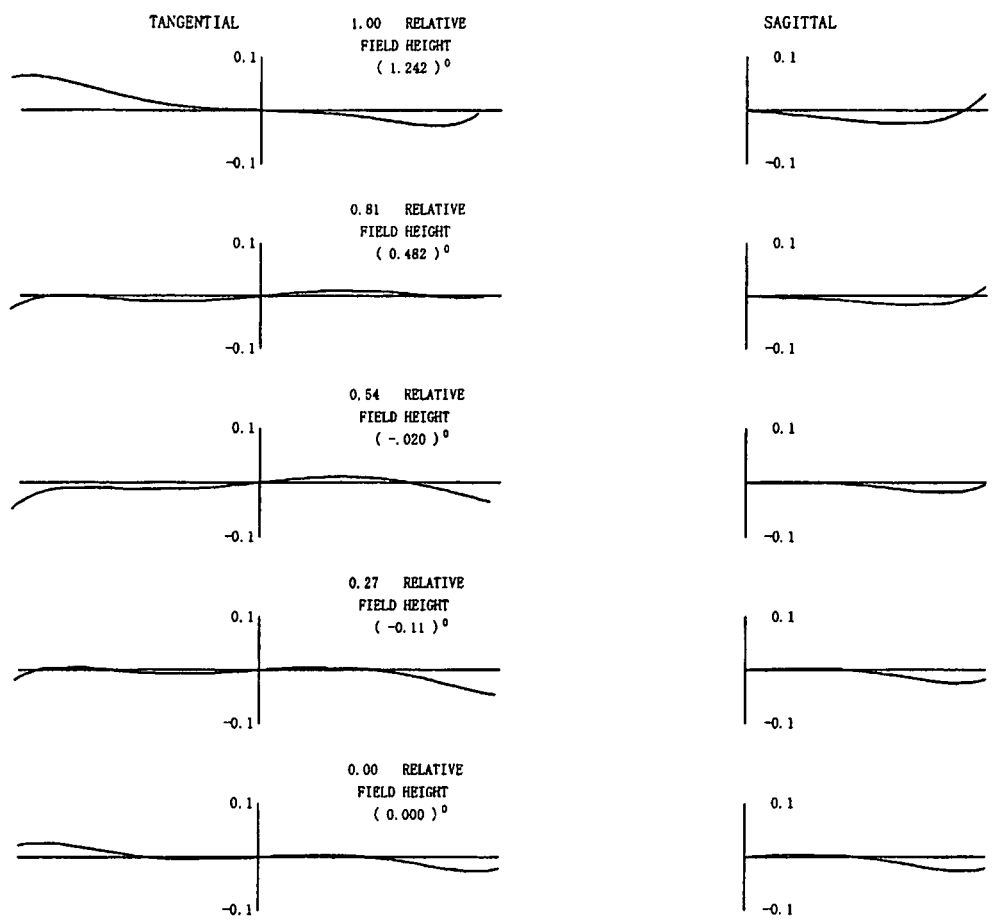
FIGS. 8A and 8B are diagrams illustrating aberration in the second liquid crystal pixel matrix.

FIGS. 8A and 8B are diagrams illustrating aberration in the color modulation light valve 50g which is a second liquid crystal pixel matrix in the present example. FIG. 8A is a diagram illustrating lateral aberration regarding the Y direction when the Z direction is set as a light traveling direction in the same manner as in FIG. 7, and FIG. 8B is a diagram illustrating lateral aberration regarding the X direction. In addition, FIGS. 8A and 8B illustrate aberration in light of 550 nm among light beams of respective wavelength bands. In FIGS. 8A and 8B, the graphs show aberration at field heights of 0 mm, 4 mm, 8 mm, 12 mm, and 15 mm from the bottom. Further, if a focal length of the incidence side meniscus lens is 133.75 mm, a focal length of the double gauss lens is 92.7 mm, a focal length of the emission side meniscus lens is 106.81 mm, and the values are applied to the above-described expression, a result thereof is 1.98 which thus satisfies the above expression.

Others

The invention is not limited to the embodiments, and may be implemented in various aspects within the scope without departing from the spirit.

Each of the dimming light valves 30g, 30r and 30b or each of the color modulation light valves 50g, 50r and 50b is transmissive, but may employ liquid crystal panels of various types such as a TN type, a VA type, and an IPS type. In addition, a reflective type as well as the transmissive type may be used. Here, the term "transmissive type" indicates a type of liquid crystal panel through which modulated light is transmitted, and the term "reflective type" indicates a type of liquid crystal panel which reflects modulated light.

In addition, in the above description, a total of six light valves including the three dimming light valves 30g, 30r and 30b constituting the dimming system 30 and the three color modulation light valves 50g, 50r and 50b constituting the image display system 50 are used, but other configurations may be employed. For example, there may be a configuration in which a single dimming light valve is disposed on a front stage of the color splitting/light guide optical system 20 as the dimming system 30. In addition, there may be a configuration in which a single dimming light valve is disposed on a rear stage of the composition optical system 60 as the dimming system 30. In either case, the above-described relay optical system including the double gauss lens and the pair of meniscus lenses having a positive power is provided, and thus it is possible to maintain a favorable image formation state and to form an image.

In addition, in the above description, images of respective colors formed by the plurality of color modulation light valves 50g, 50r and 50b are combined, but an image may be formed by a color or monochrome color modulation light valve which is a single light modulation element (color modulation element) instead of the plurality of color modulation light valves, that is, color modulation elements, and the image may be enlarged and projected by the projection optical system 70. In addition, in this case, a dimming light valve may also be constituted by a single light modulation element (luminance modulation element), and may be on a front stage or a rear stage of the color modulation light valve.

Further, in the above-described embodiments, the optical paths of respective split color light beams are in an equal optical path length, but may not be in an equal optical path length.

Instead of the color modulation light valves 50g, 50r and 50b, a digital micromirror device or the like which has a micromirror as a pixel may be used as a light modulation element.

The entire disclosure of Japanese Patent Application No. 2013-218956, filed Oct. 22, 2013 is expressly incorporated by reference herein.

What is claimed is:

1. A projector comprising:
an illumination optical system that emits light;
a light modulation device that modulates light emitted from the illumination optical system; and
a projection optical system that projects light modulated by the light modulation device,
wherein the light modulation device includes
a first pixel matrix and a second pixel matrix that are disposed in series on an optical path of the light emitted from the illumination optical system; and
a relay optical system that is disposed on the optical path between the first pixel matrix and the second pixel matrix,
wherein the relay optical system includes
a double gauss lens; and
a pair of meniscus lenses that are disposed with the double gauss lens interposed therebetween along the optical path and each of which has a positive power, and
wherein the pair of meniscus lenses are convex toward the double gauss lens side,
the first and second pixel matrices are transmissive liquid crystal pixel matrices, and
in the relay optical system, when a focal length of the double gauss lens is set to $f_{dg}$, a focal length of a first meniscus lens of the pair of meniscus lenses disposed on a light incidence side of the double gauss lens is set to $f_1$, and a focal length of a second meniscus lens disposed on a light emission side is set to $f_2$, the following expression is satisfied:

$$1.7 \leq \frac{(f_1 + f_2)/2}{f_{dg}} \leq 2.1.$$

2. The projector according to claim 1, wherein the relay optical system includes a diaphragm at the double gauss lens, and is an optical system of equal magnification which is symmetric with respect to a position of the diaphragm along an optical axis.

3. The projector according to claim 1, further comprising:
a color splitting/light guide optical system that splits the light emitted by the illumination optical system into a plurality of color light beams of different wavelength bands and guides the color light beams;
a modulation optical system that is provided with a plurality of light modulation devices each of which includes the first pixel matrix, the second pixel matrix, and the relay optical system corresponding to the plurality of color light beams, and that modulates the plurality of color light beams split by the color splitting/light guide optical system; and
a composition optical system that combines modulated light beams of respective colors which have been modulated by the modulation optical system with each other, and projects combined light toward the projection optical system.

4. The projector according to claim 3, wherein the color splitting/light guide optical system and the modulation optical system are disposed so that optical paths of the plurality of color light beams from splitting of the light in the color splitting/light guide optical system to combination of the light beams in the composition optical system are in an equal optical path length.

5. The projector according to claim 1, wherein, in the light modulation device, of the first pixel matrix and the second pixel matrix, a single pixel of the first pixel matrix disposed on an optical path upstream side corresponds to a plurality of pixels of the second pixel matrix disposed on an optical path downstream side.

6. A projector comprising:
an illumination optical system that emits light;
a light modulation device that modulates light emitted from the illumination optical system;
a projection optical system that projects light modulated by the light modulation device;
a color splitting/light guide optical system that splits the light emitted by the illumination optical system into a plurality of color light beams of different wavelength bands and guides the color light beams;
a modulation optical system that is provided with a plurality of light modulation devices each of which includes a first pixel matrix, a second pixel matrix, and a relay optical system corresponding to the plurality of color light beams, and that modulates the plurality of color light beams split by the color splitting/light guide optical system; and
a composition optical system that combines modulated light beams of respective colors which have been modulated by the modulation optical system with each other, and projects combined light toward the projection optical system,
wherein the light modulation device includes
the first pixel matrix and the second pixel matrix that are disposed in series on an optical path of the light emitted from the illumination optical system; and
the relay optical system that is disposed on the optical path between the first pixel matrix and the second pixel matrix,
wherein the relay optical system includes
a double gauss lens; and
a pair of meniscus lenses that are disposed with the double gauss lens interposed therebetween along the optical path and each of which has a positive power, and
wherein the pair of meniscus lenses are convex toward the double gauss lens side.

7. A projector comprising:
an illumination optical system that emits light;
a light modulation device that modulates light emitted from the illumination optical system; and
a projection optical system that projects light modulated by the light modulation device,
wherein the light modulation device includes
a first pixel matrix and a second pixel matrix that are disposed in series on an optical path of the light emitted from the illumination optical system; and
a relay optical system that is disposed on the optical path between the first pixel matrix and the second pixel matrix,
wherein the relay optical system includes
a double gauss lens; and
a pair of meniscus lenses that are disposed with the double gauss lens interposed therebetween along the optical path and each of which has a positive power, and
wherein the pair of meniscus lenses are convex toward the double gauss lens side,
wherein, in the light modulation device, of the first pixel matrix and the second pixel matrix, a single pixel of the first pixel matrix disposed on an optical path upstream side corresponds to a plurality of pixels of the second pixel matrix disposed on an optical path downstream side.

* * * * *